United States Patent
García Mendez et al.

(10) Patent No.: US 12,187,957 B2
(45) Date of Patent: Jan. 7, 2025

(54) WATER-BASED FOAMED SYSTEM FOR PERFORATING ZONES WITH LOW PRESSURE AND HIGH TEMPERATURE

(71) Applicant: PRO FLUIDOS, S.A. DE C.V., Nuevo Leon (MX)

(72) Inventors: Gustavo Javier García Mendez, Tabasco (MX); Gustavo Regalado Alvarado, Estado de Mexico (MX); Martin Reyes Bautista, Estado de Mexico (MX); Noé Téllez Reyes, Tabasco (MX)

(73) Assignee: PRO FLUIDOS, S.A. DE C.V., Santa Catarina (MX)

( * ) Notice: Subject to any disclaimer, the term of this patent is extended or adjusted under 35 U.S.C. 154(b) by 0 days.

(21) Appl. No.: 17/286,345

(22) PCT Filed: Oct. 18, 2019

(86) PCT No.: PCT/IB2019/058919
§ 371 (c)(1),
(2) Date: Apr. 16, 2021

(87) PCT Pub. No.: WO2020/079666
PCT Pub. Date: Apr. 23, 2020

(65) Prior Publication Data
US 2021/0395598 A1    Dec. 23, 2021

(30) Foreign Application Priority Data
Oct. 19, 2018    (MX) .................. MX/A/2018/012888

(51) Int. Cl.
*C09K 8/38* (2006.01)
*C09K 8/14* (2006.01)
*C09K 8/20* (2006.01)
*C09K 8/24* (2006.01)

(52) U.S. Cl.
CPC .......... *C09K 8/38* (2013.01); *C09K 8/145* (2013.01); *C09K 8/206* (2013.01); *C09K 8/24* (2013.01); *C09K 2208/12* (2013.01)

(58) Field of Classification Search
CPC .......... C09K 8/38; C09K 8/145; C09K 8/206; C09K 8/24; C09K 2208/12
See application file for complete search history.

(56) References Cited

U.S. PATENT DOCUMENTS

| | | | | |
|---|---|---|---|---|
| 2,603,598 A * | 7/1952 | Meadors | ............ | C09K 8/22 507/131 |
| 3,601,194 A * | 8/1971 | Gallus | ............ | C09K 8/92 507/131 |
| 5,591,699 A * | 1/1997 | Hodge | ............ | C09K 8/08 507/213 |
| 2015/0072902 A1* | 3/2015 | Lafitte | ............ | C09K 8/035 507/112 |
| 2018/0037795 A1* | 2/2018 | Goel | ............ | C09K 8/80 |

FOREIGN PATENT DOCUMENTS

| | | | | |
|---|---|---|---|---|
| CN | 103320105 A | | 9/2013 | |
| CN | 104232038 A | * | 12/2014 | ............ C09K 8/38 |
| CN | 104449600 A | * | 3/2015 | ............ C08F 220/54 |
| EP | 0058917 A1 | | 9/1982 | |
| EP | 0668339 A1 | * | 8/1995 | |
| WO | 2014209485 A1 | | 12/2014 | |
| WO | 2016080979 A1 | | 5/2016 | |
| WO | 2016164037 A1 | | 10/2016 | |

OTHER PUBLICATIONS

International Search Report for PCT/IB2019/058919 dated Jan. 16, 2020.
Written Opinion for PCT/IB2019/058919 dated Jan. 16, 2020.

* cited by examiner

*Primary Examiner* — Kumar R Bhushan
(74) *Attorney, Agent, or Firm* — Neal, Gerber & Eisenberg LLP (57) ABSTRACT

The present invention refers to a composition for water-based foamed fluid with high thermal stability for drilling depressed areas in oil and gas wells, comprising: i) a base fluid or drilling water consisting of fresh water; ii) a stabilizing agent; ii) a viscosifying agent; iv) a filtering reducing agent; v) a clay inhibiting agent; vi) an alkalizing agent and acid gas sequestering agent; vii) a thermal stabilizing agent; and viii) a foaming agent. Also, the present invention refers to a system that uses said composition for fluid and water-based foamed fluid with high thermal stability, the method of preparing the composition for fluid, the method of preparing the fluid and application of the composition and fluid in a water-based foamed fluid system with high thermal stability for drilling depressed or low-pressure areas in oil and gas wells.

12 Claims, 2 Drawing Sheets

Figure 1

Figure 2

WATER-BASED FOAMED SYSTEM FOR PERFORATING ZONES WITH LOW PRESSURE AND HIGH TEMPERATURE

PRIORITY CLAIM

This application is a national stage patent application of PCT/IB2019/058919, filed on Oct. 18, 2019 entitled "WATER-BASED FOAMED SYSTEM FOR PERFORATING ZONES WITH LOW PRESSURE AND HIGH TEMPERATURE" which claims priority from Mexican Patent Application No. MX/a/2018/012888, filed Oct. 19, 2018 both of which are incorporated by reference in their entirety.

FIELD OF THE INVENTION

The present invention refers to a composition for water-based foamed fluid and water-based foamed fluid with high thermal stability for drilling depressed or low-pressure areas in oil and gas wells. Also, the present invention relates to the system, the method of preparing the composition for fluid, the method of preparing the fluid and application of the composition and fluid in a water-based foamed fluid system with high thermal stability for drilling depressed or low pressure areas in oil and gas wells.

BACKGROUND OF THE INVENTION

The types of fluids most commonly used to date for drilling depressed wells or those with low fracture gradients are the following: bentonite fluid with densities from 1.02 to 1.05 g/cm$^3$, polymeric bentonite fluid with densities from 1.02 to 1.05 g/cm$^3$, low density polymeric fluids with densities from 0.86 to 0.98 g/cm$^3$ (80% diesel and 20% water), viscous bumps of bentonite sludge (blind drilling), seawater based fluids with Xantana rubber, silicates and maximum load lubricants with densities from 1.05 to 1.07 g/cm$^3$ and water based ultralight fluids, alkalizing agent, bentonite, filtering reducer, thermal stabilizer, clay inhibitor and a foaming agent with densities from 0.80 to 0.30 g/cm$^3$; all of them having a thermal stability of 150° C.

In this regard, the use of foamed water based ultralight fluids formulated with nitrogen injection with densities of <1.0 to 0.2 g/cm$^3$ exists in the prior art, however, the thermal stability is limited up to a temperature of 150° C. However, currently there are wells with depressed areas with temperatures up to 180° C., which becomes a problem when drilling with foamed ultralight fluids that have thermal stability equal to or less than 150° C.

Additionally, nowadays, 100% oil-based aerated or nitrogenous fluids are being used that use diesel oil and other additives that provide certain suspending properties but do not use foaming agents to avoid immediate gas separation when circulation is suspended, this generates large oil-base sludge losses to the formation causing drilling costs to increase considerably. International patent application WO2014/209485 A1 discloses high-temperature, high-pressure crosslinked copolymers (HTHP), water-based and/or non-HTHP for oil and gas applications consisting of (i) a linear crosslinked polymer of poly(polymerizable vinyl amide/carboxylic acid), having a composition by weight of 25-75% by weight of a vinyl amide monomer, and 25-75% by weight of a polymerizable carboxylic acid monomer; and (ii) a crosslinking agent in an amount of 0.01 to 5% based on the weight of total monomers, however, said document does not disclose or suggest the compositions for water-based foamed fluid and water-based foamed fluids with high thermal stability, under the characteristics and components disclosed in the present invention.

Chinese patent application CN103320105 A discloses a recyclable microbubble drilling fluid that contains a base sludge containing bentonite and sodium carbonate, and a treatment agent containing a foaming agent, a foam stabilizer, a foam enhancer, a filtering reducer, and an inhibitor and flow pattern modifier, however, said document neither discloses nor suggests compositions for water-based foamed fluid and water-based foamed fluids with high thermal stability, under the characteristics and components disclosed in the present invention.

Thus, it is necessary to have a foamed fluid system that allows the depressed areas to be drilled and to maintain their stability at temperatures of the order of 180° C. without incurring in large fluid losses towards the formation, which damage the producing formation and the fluid costs are remarkably increased.

BRIEF DESCRIPTION OF THE INVENTION

The present invention refers to a composition for water-based foamed fluid with high thermal stability (higher than 180° C.), for drilling depressed areas in oil and gas wells, comprising: i) a base fluid or drilling water consisting of fresh water; ii) a stabilizing agent; ii) a viscosifying agent; iv) a filtering reducing agent; v) a clay inhibiting agent; vi) an alkalizing agent and acid gas sequestering agent; vii) a thermal stabilizing agent; and viii) a foaming agent.

Another embodiment of the present invention refers to a water-based foamed fluid with high thermal stability (higher than 180° C.), for drilling depressed areas in oil and gas wells, comprising: I) the composition for water-based foamed fluid described above; and II) gas bubbles that are occluded in said fluid. Specifically, the water-based foamed fluid with high thermal stability comprises: i) a base fluid or drilling water consisting of fresh water; ii) a stabilizing agent; il) a viscosifying agent; iv) a filtering reducing agent; v) a clay inhibiting agent; vi) an alkalizing agent and acid gas sequestering agent; vii) a thermal stabilizing agent; viii) a foaming agent; and ix) gas bubbles occluded in said fluid.

Another embodiment of the present invention refers to a process for preparing a composition for water-based foamed fluid with high thermal stability (higher than 180° C.), for drilling depressed areas in oil and gas wells, said process comprising the stages of:

a) in a suitable container containing the drilling water, adding the stabilizing agent and stirring for at least 20 minutes or the time necessary to achieve the hydration thereof;

b) to the mixture obtained in step a), adding the viscosifying agent and stirring for at least 10 minutes or the time necessary to achieve the integration thereof;

c) to the mixture obtained in step b), adding the filtering reducing agent and stirring for at least 20 minutes or the time necessary to achieve the integration thereof;

d) to the mixture obtained in step c), adding the shale inhibiting agent and stirring for at least 10 minutes or the time necessary to achieve the complete integration thereof;

e) to the mixture obtained in step d), adding the alkalizing agent and acid gas sequestrant agent and stirring for about 10 minutes;

f) to the mixture obtained in step e), adding the thermal stabilizer and stirring for at least 20 minutes or the time necessary to achieve the integration thereof;

g) to the mixture obtained in step f), adding the foaming agent and stirring for at least 10 minutes;

Still another embodiment of the present invention refers to a process for preparing a water-based foamed fluid with high thermal stability (higher than 180° C.), for drilling depressed areas in oil and gas wells, said process comprising the steps of:

A) in a suitable container, collecting the composition for water-based foamed fluid with high thermal stability (higher than 180° C.) of the present invention;

B) subtracting the composition for water-based foamed fluid from step A), and combining or mixing it with an appropriate gas;

C) passing the mixture from step B) through a foam generator or foamer, to obtain said water-based foamed fluid with high thermal stability.

Still another embodiment of the present invention refers to a water-based foamed fluid system with high thermal stability for drilling depressed or low-pressure areas in oil and gas wells, wherein a composition for fluid or base fluid (without gas occluded) is prepared in mixing dams and is contained in a suction tank, then it is circulated with a sludge pump through a circulatory circuit wherein a gas is injected. The gas can be air, membrane nitrogen, or cryogenic nitrogen, among others, which passes through a pressure booster and is injected into the circulatory circuit through a pipe to be mixed with the base sludge. The base fluid-gas mixture is passed through a foam generator, which passes through a standpipe, a drill string, and an auger to return through an annular gap. The well in which it is operated is kept under pressure and the fluid leaves the well through a rotary head to be sent to a choke and later to a gas-sludge separator, wherein part of the gas is separated from the foam, and the drill cuttings-foamed fluid mixture is sent to a solids control equipment, wherein the drill cuttings are separated and the base sludge is sent back to the mixing dams, to be pumped again into the well previously passing through the foam generator and injecting the necessary amount of gas to reduce the density to the required values, and close the circulatory circuit.

Additional embodiments of the present invention are represented by the objectives achieved through the system of the present invention:

Objects of the System

The present invention provides a water-based foamed fluid and fluid composition that is stable, with half-lives greater than 20 minutes and up to 6 hours, or longer, that has the ability to house and retain a gas, forming a stable foam under the effects of the bottom pressures and temperatures of up to 180° C. or more.

Said water-based foamed fluid prevents the destabilization of the walls of the well during its use in drilling depressed areas and likewise prevents it from interacting with the formation, hydrating it, or causing its dispersion.

The system and fluid of the present invention resists the contamination of congenital water flows from the formation, invasion of crude oil, drill cuttings and acid gases ($CO_2$ and $H_2S$), among others.

Also, in combination with a gas, it reduces its specific gravity to values of the order of 0.80 to 0.25 $g/cm^3$ and it additionally has good rheological properties to allow cleaning the bore in order to improve drilling progress, suspend cuttings in any situation of waiting times and bring the cuttings to the surface for its removal.

Additionally, the system and fluid of the present invention control and/or reduce the circulation losses that occur when drilling high permeability areas, areas with cracks and/or natural fractures, thereby avoiding damage to the production formation. This is due to the low pressure of the hydrostatic column, the high half-life time and the high rheology and/or consistency of the foam.

DETAILED DESCRIPTION OF THE INVENTION

A better understanding of the features and advantages of the invention will be obtained by reference to the following detailed description and accompanying figures, which describe the illustrative and preferred embodiments of the invention. However, the following detailed description should not be taken to unduly limit the present invention, since some modifications and variations in the embodiments discussed herein may be carried out by a person skilled in the art without departing from the spirit or scope of the present invention.

The composition for water-based foamed fluid object of the present invention is mainly constituted by a base fluid (fresh water), a foaming agent, a foam stabilizer, a viscosifying agent, a filtering reducing agent, a shale (clays) inhibiting agent and an agent to provide stability and thermal resistance to the foam.

Likewise, the water-based foamed fluid with high thermal stability (higher than 180° C.), for drilling depressed areas in oil and gas wells, also the object of the present invention, consists mainly of a base fluid or drilling water, a stabilizing agent, a viscosifying agent, a filtering reducing agent, a shales (clays) inhibiting agent, an alkalizing and sequestering agent for acid gases, a thermal stabilizing agent, a foaming agent and gas bubbles occluded in the fluid.

The combination of the foaming agent with the thermal stabilizer provides thermal stability to the water-based foamed fluid of up to 180° C., with a half-life of 11 hours or more. This feature ensures that the fluid will remain stable inside the bore, under the effects of pressure and temperatures of up to 180° C. for long periods of time, thus avoiding the classic problems of packing, string entrapment, outbreaks and/or loss of circulation caused by the decrease in consistency (lack of stability) suffered by conventional foaming fluids that have short half-life times (less than 20 minutes).

Figure 1:
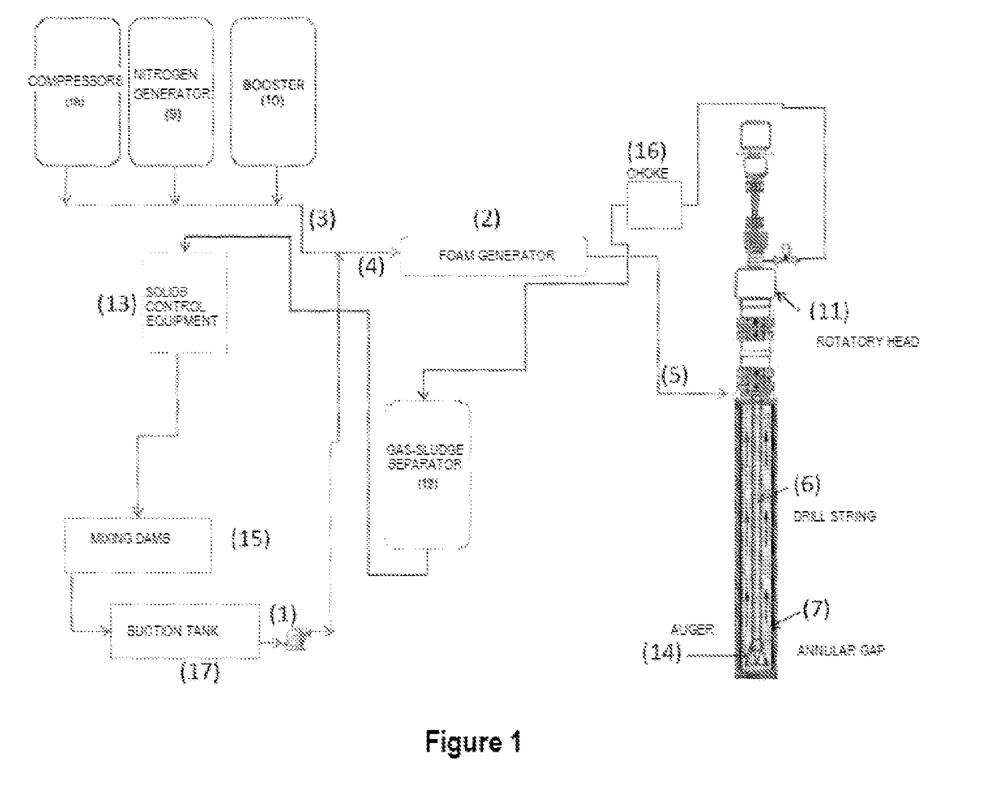
FIG. 1. Diagram of the Circulatory System for drilling under balance with a water-based foamed fluid with nitrogen injection and foam generator, according to the present invention.

As seen in FIG. 1, the fluid or base fluid composition (without occluded gas) of the present invention, prepared in the mixing dams (15) and contained in the suction tank (17), is circulated with a pump sludge (1) through a circulatory circuit wherein a gas is injected. The gas can be air generated by means of compressors (18), membrane nitrogen (9), cryogenic nitrogen, among others, which passes through a pressure booster (10) and is injected into the circulatory circuit through the pipeline (3) to be mixed with the base sludge in the pipeline (4). The base fluid-gas mixture is passed through a foam generator (2), which passes through a standpipe (5), a drill string (6) and an auger (14) to return through an annular gap (7). The well is kept under pressure and the fluid leaves the well through a rotatory head (11) to be sent to a choke (16) and later to a gas-sludge separator (12), wherein part of the gas is separated from the foam and the drill cuttings-foamed fluid mixture are sent to a solids control equipment (13) wherein the drill cuttings are separated and the base sludge is sent to the mixing dams (15) to be pumped again into the well, where the necessary amount of gas is previously injected to reduce the density to the required values and passes through the foam generator to close the circulatory circuit.

In general, the present invention refers to a water-based foamed fluid system with thermal stability higher than 180° C. for drilling depressed areas in oil and gas wells, wherein the composition for fluid according to any of the claims, is prepared in mixing dams (15) to form a base sludge, which is contained in a suction tank (17), then it is circulated with a sludge pump (1) through a circulatory circuit where a gas is injected, which previously passes through a pressure booster (10) and is injected into the circulatory circuit by means of a first pipe (3) to be mixed with the base sludge in a second pipe (4), the base sludge-gas mixture is passed through a foam generator (2) to form a foamed fluid which is entered into a drilling well through a standpipe (5), a drill string (6) and a auger (14), for then return it through an annular space (7) and extract it from the well through a rotatory head (11), then the outgoing fluid is sent to a choke (16) and then to a gas-sludge separator (12) which separates part of the foam gas and the drill cuttings-foamed fluid mixture, which is sent to a solids control equipment (13) wherein the drill cuttings are separated and the base sludge is sent to the mixing dams (15) to close the circulatory circuit, wherein, for this new base sludge, prior to the formation the foamed fluid once again, the necessary amount of gas is injected to reduce the density of said fluid, which allows the continuous operation of the system.

Definitions are given below for the special polymers to impart suspension and cuttings-carrying properties, polymers to control filtration and form a waterproof plaster in the wall that allows stabilizing the walls of the bore, the alkalizing agents, the hydration inhibitors, the acid gas sequestering agents, the foaming agents and further components used in the present invention.

The stabilizing agent is preferably used in an amount of 15 to 40 kg for each $m^3$ of the composition for fluid or water-based foamed fluid and is selected from the group of clays such as treated or untreated montmorillonites, smectite, hectorite, saponite, beidelite or stevensite; and more specifically of the type of treated and/or untreated montmorillonites.

The viscosifying agent is preferably used in an amount of 2 to 10 kg for each $m^3$ of the composition for fluid or water-based foamed fluid, and is a polymer whose average molecular weight is close to $2\times10^6$ g/mol, comprising at least one member selected from the group of natural Xantana gum polysaccharides, guar gum, or polysaccharides from the cellulose group, such as carboxymethyl cellulose, polyanionic cellulose, or mixtures thereof, and more preferably the polymer is selected from the group of *Xanthomonas* gums which are manufactured by carbohydrate fermentation with generic *Xanthomonas* bacteria, which may be one or more of the group of *Xanthomonas phaseoli, Xanthomonas mulvacearn, Xanthomonas campestris, Xanthomonas carotoe* and *Xanthomonas translucean*. The gum produced by *Xanthomonas campestri* is preferred for the purpose of the present invention.

The filtering reducing agent is preferably used in an amount of 6 to 15 kg for each $m^3$ of the composition for fluid or water-based foamed fluid, and is a copolymer whose average molecular weight is of $2\times10^6$ to $4\times10^6$ g/mol from the group of polyacrylamides, comprising at least one member selected from the group of acrylamides, N-substituted acrylamides, methacrylamides, N-substituted methacrylamides, acrylates, methacrylates, N-vinyl amides, N-allyl amides, vinyl alcohol, vinyl ethers, vinyl esters, allyl alcohol, allyl ethers, allyl esters, vinyl imidazole, allyl imidazole, and any combination of any of the above.

The shale inhibiting agent is preferably used in an amount of 4 to 15 kg per $m^3$ of the composition for fluid or water-based foamed fluid, and can be selected from the group of acrylonitrile-derived inhibitors, which can be a mixture of polyacrylates with polyacrylamides, with a molecular weight ranging from $1\times10^6$ to $15\times10^6$ g/mol, quaternary amines derived from fatty acids, potassium chloride and mixtures thereof and most preferably, the preferred inhibitor of the invention is a mixture of poly acrylates and poly acrylamides with an average molecular weight of $1\times10^6$ to $15\times10^6$ g/mol.

The alkalizing and acid gas sequestering agent is preferably used in an amount of 2 to 10 L for each $m^3$ of the composition for fluid or water-based foamed fluid, and is an alkanolamine or alkylamine, comprising at least one member selected from the group of monoethanolamine, diethanolamine, 1-amino-2-propanol, ethylenediamine, 1,2-diamino-propane, diethylenetriamine, triethylenetriamine and tetraethylenepentamine; and more specifically amines derived from mono, di, or tri-alcohols.

The thermal stabilizing agent is preferably used in an amount of 15 to 20 kg for each $m^3$ of the composition for fluid or water-based foamed fluid, and is a polymer that has an average molecular weight in the range of $8\times10^6$ to $14\times10^6$ g/mol, and can be selected from the group of poly-di-allyl-dimethyl-ammonium chloride, from the polymer derived from the alkali metal salt of 2-acrylamide-2-methyl-propane sulfonic acid or from polyvinylpyrrolidone or mixtures thereof.

The foaming agent is preferably used in an amount of 10 to 25 L per $m^3$ of the composition for fluid or water-based foamed fluid, and can be selected from the group of primary alcohols or ethoxylated secondary alcohols with a range of 5 to 9.5 mol of ethylene oxide and ethoxylated fatty acids with a range of 2 to 10 moles of ethylene oxide, and more preferably the type of foaming agent used in the present invention is manufactured from mixtures of saturated fatty acids of the alkyl group of 10 to 14 carbon atoms with a range of 2 to 8 moles of ethylene oxide.

The base fluid (fresh water) or Drilling Water is used in an amount of 900 to 1,000 L for each $m^3$ of the composition for fluid or water-based foamed fluid, and preferably in an amount of 960 L.

The appropriate gas used in the present invention to generate bubbles can be selected from the group consisting of: air, cryogenic nitrogen, membrane nitrogen, carbon dioxide, or any other gas known in the prior art that is suitable for this purpose, i.e., it is inert to the fluid and capable of generating foam in the fluid.

In another embodiment, the present invention refers to a process for preparing a composition for water-based foamed fluid with high thermal stability for drilling depressed or low-pressure areas in oil and gas wells. A typical formulation and order of addition of materials that comprise said formulation of the System object of the invention, are summarized in Table 1.

TABLE 1

Typical Formulation and Order of addition of materials for the composition object of the invention.

| Order of Addition | Material, Units | Typical Formulation of the composition object of the invention | Stirring time (min) |
|---|---|---|---|
| 1 | Drilling water, L | 960 | — |
| 2 | Stabilizing agent, kg/m$^3$ | 1-40 | 20 |
| 3 | Viscosifying agent, kg/m$^3$ | 2-10 | 10 |
| 4 | Filtering network agent, kg/m$^3$ | 6-15 | 20 |
| 5 | Shale inhibiting agent, kg/m$^3$ | 4-15 | 10 |
| 6 | Alkalizing and acid gas sequestering agent, L/m$^3$ | 2-10 | 10 |
| 7 | Thermal stabilizing, kg/m$^3$ | 15-20 | 20 |
| 8 | Foaming Agent, L/m$^3$ | 10-25 | 10 |

In particular, the process of preparing the composition for water-based foamed fluid with high thermal stability for drilling depressed areas of the present invention, comprises the following steps:
  a) in a suitable container containing the drilling water, adding the stabilizing agent and stirring for at least 20 minutes or the time necessary to achieve the hydration thereof;
  b) to the mixture obtained in step a), adding the viscosifying agent and stirring for at least 10 minutes or the time necessary to achieve the integration thereof;
  c) to the mixture obtained in step b), adding the filtering reducing agent and stirring for at least 20 minutes or the time necessary to achieve the integration thereof;
  d) to the mixture obtained in step c), adding the shale inhibiting agent and stirring for at least 10 minutes or the time necessary to achieve the complete integration thereof;
  e) to the mixture obtained in step d), adding the alkalizing agent and acid gas sequestrant agent and stirring for about 10 minutes;
  f) to the mixture obtained in step e), adding the thermal stabilizer and stirring for at least 20 minutes or the time necessary to achieve the integration thereof;
  g) to the mixture obtained in step f), adding the foaming agent and stirring for at least 10 minutes.

In all cases the stirring time can be modified according to the stirring efficiency available at the job site.

Similarly, the process for preparing the water-based foamed fluid with high thermal stability for drilling depressed areas of the present invention, comprises the following steps:
  A) in a suitable container, collecting the composition for water-based foamed fluid with high thermal stability (higher than 180° C.) of the present invention;
  B) subtracting the composition for water-based foamed fluid from step A), and combining or mixing it with an appropriate gas;
  C) passing the mixture from step B) through a foam generator or foamer, to obtain said water-based foamed fluid with high thermal stability.

The following examples describe various embodiments of the present invention, and such examples are intended to be merely illustrative and not limiting of the compositions, systems, procedures, and applications thereof.

The term "B.R." used in the examples should be understood as Before Rolling or Before the Rolling, while the term "A.R." should be understood as After Rolling or After the Rolling.

EXAMPLES

Specific Examples of Compositions

Specific examples of the compositions for fluid and water-based foamed fluid of the present invention were made to illustrate the preparation of the compositions and fluids of the system object of the invention, as well as the behavior of said system increasing and reducing the concentration of foaming agent. Additionally, tests of thermal stability, rheological behavior and liquid phase drainage were carried out, subjecting the compositions of the present invention to different temperatures and to the action of the most common contaminants found when drilling depressed areas.

For the preparation of the HT water-based foamed fluid, from the practical examples of the invention, a Hamilton Beach type stirrer was used, mixing the products in the order indicated in Table 2.

TABLE 2

Order of addition of materials for the preparation of HT water-based foamed fluid.

| Material | Stirring | Stirring Time (min) |
|---|---|---|
| Drilling Water | Hamilton Beach at 28000 rpm | — |
| Stailizing Agent | Hamilton Beach at 28000 rpm | 20 |
| Viscosifying Agent | Hamilton Beach at 28000 rpm | 10 |
| Filtering Reducing Agent | Hamilton Beach at 28000 rpm | 20 |
| Shale Inhibiting Agent | Hamilton Beach at 28000 rpm | 10 |
| Alkalizing agent and acid gas sequestering agent | Hamilton Beach at 28000 rpm | 10 |
| Viscosifying and Network. HT Filtering | Hamilton Beach at 28000 rpm | 20 |
| Foaming Agent | Hamilton Beach at 28000 rpm | 45 |

Rheological behavior tests were carried out on a coaxial cylinder rotational viscometer at a temperature of 50° C. at different rotational speeds (shear).

The thermal stability tests were carried out by means of a temperature aging test for a certain time, using stainless steel cells with a capacity of 500 cm$^3$ and pressurizing with an inert gas (nitrogen) at 200 psig using a 6 rollers-rolling oven enabled with temperature controller with PID (Proportional Integral Differential) control mode as heating means.

Foam stability (half-life or drain time) was determined by emptying a volume of the HT water-based foamed fluid into a 100, 250, or 500 cm$^3$ capacity cylinder and measuring the amount of liquid phase separated at the bottom of the cylinder during a certain time.

The contamination tests were carried out by adding a certain amount of the contaminant to the HT water-based foamed fluid and measuring the rheological and drainage properties before and after subjecting them to an aging process at different temperatures. The concentrations of contaminants used were as follows:
  Salt water (saturated NaCl brine)=50 L/m$^3$
  Crude oil=50 L/m$^3$
  Carbon dioxide ($CO_2$)=200 psig in a 500 cm$^3$ rolling cell The density value reported in laboratory tests is the one obtained through the agitation process where the air is occluded due to the shape of the propeller and the speed with which the fluid is stirred, this value can be modified depending on the amount of gas (nitrogen, air, or others) that is injected into the mixture through the propeller of the Hamilton Beach stirrer (in case the HT foamed system is prepared at the job site, the foam is formed when mixing the gas and the base sludge containing the foaming agent and passing them through the foam generator).

The density reported in the examples was obtained at room temperature and atmospheric pressure by weighing a volume of 100 cm³ of the water-based inhibited polymeric foamed fluid, using for this, a grain scale approximating to 0.1 g and a 100 cm³ test tube.

The results of the application examples are presented in Tables 2.1 to 2.14, which illustrate the preparation and behavior of the composition of the system object of the invention, as well as the behavior when increasing and decreasing the concentration of foaming agent. Additionally, tests of thermal stability, rheological behavior and liquid phase drainage when being subject to different temperatures and to the action of the most common contaminants found when drilling the depressed area, are presented.

In all cases, the volume of the foam sample for the half-life test (drained) was 500 cm³.

TABLE 2.1

Specific Formulation Examples of the System object of the invention modifying the concentration of foaming agent.

| Formulation Product | 1 | 2 | 3 | Stirring Time (min) |
|---|---|---|---|---|
| | Concentration | | | |
| Drilling Water, L/m³ | 960 | 960 | 960 | — |
| Stabilizing Agent, kg/m³ | 30 | 30 | 30 | 20 |
| Viscosifying agent, kg/m³ | 2 | 2 | 2 | 10 |
| Filtering reducing agent, kg/m³ | 8 | 8 | 8 | 20 |
| Shale inhibiting agent, kg/m³ | 6 | 6 | 6 | 10 |
| Alkalizing agent and acid gas seguestering agent, L/m³ | 2 | 2 | 2 | 10 |
| Thermal Stabilizer, kg/m³ | 17.5 | 17.5 | 17.5 | 20 |
| Foaming Agent, L/m³ | 10 | 15 | 20 | 45 |

TABLE 2.2

Density and rheological properties @ 50° C. of the water-based inhibited polymeric foamed fluid object of this invention freshly prepared in the laboratory and after rolling at 180° C. for 6 hours. Foaming agent concentration of 10 L/m³.

| | Base Fluid 10 L/m³ Foaming agent | |
|---|---|---|
| RESULTS | B.R. | A.R. 180° C. 6 h |
| Fluid density, (g/cm³) | 0.39 | 0.43 |
| Bulk Viscosity. (cP) | 180 | 50 |
| Plastic Viscosity, (cP) | 60 | 44 |
| Yield Strength, (lb/100 ft²) | 240 | 12 |
| Reading 600, (lb/100 ft²) | 360 | 100 |
| Reading 300, (lb/100 ft²) | 300 | 56 |
| Reading 200, (lb/100 ft²) | 246 | 42 |
| Reading 100, (lb/100 ft²) | 180 | 25 |
| Reading 6, (lb/100 ft²) | 68 | 6 |
| Reading 3, (lb/100 ft²) | 57 | 3 |
| Gel 10'/10", (lb/100 ft²) | 46/46 | 3/4 |
| API Filtering, (cm³) | 7.0 | 7.0 |
| Fluid pH | 10.11 | 9.12 |
| Filtered pH | 10 | 9 |
| Half-life (drained), hours | 10 | — |

TABLE 2.3

Density and rheological properties @ 50° C. of the water-based inhibited polymeric foamed fluid object of this invention freshly prepared in the laboratory and after rolling at 180° C. for 6 hours. Foaming agent concentration of 15 L/m³.

| | Base Fluid 15 L/m³ Foaming agent | |
|---|---|---|
| RESULTS | B.R. | A.R. 180° C. 6 h |
| Fluid density, (g/cm³) | 0.47 | 0.41 |
| Bulk Viscosity. (cP) | 172 | 105 |
| Plastic Viscosity, (cP) | 98 | 89 |
| Yield Strength, (lb/100 ft²) | 148 | 32 |
| Reading 600, (lb/100 ft²) | 344 | 210 |
| Reading 300, (lb/100 ft²) | 246 | 121 |
| Reading 200, (lb/100 ft²) | 190 | 90 |
| Reading 100, (lb/100 ft²) | 166 | 54 |
| Reading 6, (lb/100 ft²) | 60 | 15 |
| Reading 3, (lb/100 ft²) | 44 | 6 |
| Gel 10'/10", (lb/100 ft²) | 46/46 | 5/6 |
| API Filtering, (cm³) | 6.4 | 6.4 |
| Fluid pH | 10.1 | 9.18 |
| Filtered pH | 10 | 10 |
| Half-life (drained), hours | 11.5 | — |

TABLE 2.4

Density and rheological properties @ 50° C. of the water-based inhibited polymeric foamed fluid object of this invention freshly prepared in the laboratory and after rolling at 180° C. for 6 hours. Foaming agent concentration of 20 L/m³.

| | Base Fluid 20 L/m³ Foaming agent | |
|---|---|---|
| RESULTS | B.R. | A.R. 180° C. 6 h |
| Fluid density, (g/cm³) | 0.47 | 0.34 |
| Bulk Viscosity. (cP) | 165 | 60 |
| Plastic Viscosity, (cP) | 70 | 46 |
| Yield Strength, (lb/100 ft²) | 190 | 28 |
| Reading 600, (lb/100 ft²) | 330 | 120 |
| Reading 300, (lb/100 ft²) | 260 | 74 |
| Reading 200, (lb/100 ft²) | 208 | 55 |
| Reading 100, (lb/100 ft²) | 160 | 33 |
| Reading 6, (lb/100 ft²) | 56 | 5 |
| Reading 3, (lb/100 ft²) | 42 | 3 |
| Gel 10'/10", (lb/100 ft²) | 44/44 | 4/6 |
| API Filtering, (cm³) | 5.8 | 8 |
| Fluid pH | 10.13 | 9.14 |
| Filtered pH | 10 | 9.5 |
| Half-life (drained), hours | 12 | — |

TABLE 2.5

Density and rheological properties @ 50° C. of the water-based inhibited polymeric foamed fluid object of this invention freshly prepared in the laboratory contaminated with $CO_2$, after rolling at 180° C. for 6 hours. Foaming agent concentration of 10 L/m³.

| | Base Fluid 10 L/m³ Foaming agent, contaminated with $CO_2$ (200 psig) | |
|---|---|---|
| RESULTS | B.R. | A.R. 180° C. 6 h |
| Fluid density, (g/cm³) | 0.39 | 0.48 |
| Bulk Viscosity. (cP) | 180 | 45 |
| Plastic Viscosity, (cP) | 60 | 35 |
| Yield Strength, (lb/100 ft²) | 240 | 20 |
| Reading 600, (lb/100 ft²) | 360 | 90 |
| Reading 300, (lb/100 ft²) | 300 | 55 |
| Reading 200, (lb/100 ft²) | 246 | 38 |
| Reading 100, (lb/100 ft²) | 180 | 22 |
| Reading 6, (lb/100 ft²) | 68 | 4 |
| Reading 3, (lb/100 ft²) | 57 | 3 |
| Gel 10'/10", (lb/100 ft²) | 46/46 | 3/5 |

TABLE 2.5-continued

Density and rheological properties @ 50° C. of the water-based inhibited polymeric foamed fluid object of this invention freshly prepared in the laboratory contaminated with $CO_2$, after rolling at 180° C. for 6 hours. Foaming agent concentration of 10 L/m³.

| RESULTS | Base Fluid 10 L/m³ Foaming agent, contaminated with $CO_2$ (200 psig) | |
|---|---|---|
| | B.R. | A.R. 180° C. 6 h |
| API Filtering, (cm³) | 7 | 7.2 |
| Fluid pH | 10.11 | 8.99 |
| Filtered pH | 10 | 9.71 |
| Half-life (drained), hours | 10 | — |

TABLE 2.6

Density and rheological properties @ 50° C. of the water-based inhibited polymeric foamed fluid object of this invention freshly prepared in the laboratory contaminated with $CO_2$, after rolling at 180° C. for 6 hours. Foaming agent concentration of 15 L/m³.

| RESULTS | Base Fluid 15 L/m³ Foaming agent, contaminated with $CO_2$ (200 psig) | |
|---|---|---|
| | B.R. | A.R. 180° C. 6 h |
| Fluid density, (g/cm³) | 0.47 | 0.46 |
| Bulk Viscosity. (cP) | 172 | 69 |
| Plastic Viscosity, (cP) | 98 | 48 |
| Yield Strength, (lb/100 ft²) | 148 | 42 |
| Reading 600, (lb/100 ft²) | 344 | 138 |
| Reading 300, (lb/100 ft²) | 246 | 90 |
| Reading 200, (lb/100 ft²) | 190 | 70 |
| Reading 100, (lb/100 ft²) | 166 | 43 |
| Reading 6, (lb/100 ft²) | 60 | 10 |
| Reading 3, (lb/100 ft²) | 44 | 5 |
| Gel 10'/10", (lb/100 ft²) | 46/46 | 5/7 |
| API Filtering, (cm³) | 6.4 | 7.8 |
| Fluid pH | 10.1 | 9.2 |
| Filtered pH | 10 | 9.36 |
| Half-life (drained), hours | 11.5 | — |

TABLE 2.7

Density and rheological properties @ 50° C. of the water-based inhibited polymeric foamed fluid object of this invention freshly prepared in the laboratory contaminated with $CO_2$, after rolling at 180° C. for 6 hours. Foaming agent concentration of 20 L/m³.

| RESULTS | Base Fluid 20 L/m³ Foaming agent, contaminated with $CO_2$ (200 psig) | |
|---|---|---|
| | B.R. | A.R. 180° C. 6 h |
| Fluid density, (g/cm³) | 0.47 | 0.39 |
| Bulk Viscosity. (cP) | 165 | 120 |
| Plastic Viscosity, (cP) | 70 | 105 |
| Yield Strength, (lb/100 ft²) | 190 | 30 |
| Reading 600, (lb/100 ft²) | 330 | 240 |
| Reading 300, (lb/100 ft²) | 260 | 135 |
| Reading 200, (lb/100 ft²) | 208 | 125 |
| Reading 100, (lb/100 ft²) | 160 | 85 |
| Reading 6, (lb/100 ft²) | 56 | 15 |
| Reading 3, (lb/100 ft²) | 42 | 11 |
| Gel 10'/10", (lb/100 ft²) | 44/44 | 9/11 |
| API Filtering, (cm³) | 5.8 | 5.8 |
| Fluid pH | 10.13 | 8.7 |
| Filtered pH | 10 | 9.68 |
| Half-life (drained), hours | 12 | — |

TABLE 2.8

Density and rheological properties @ 50° C. of the water-based inhibited polymeric foamed fluid object of this invention freshly prepared in the laboratory contaminated with 50 L/m³ of NaCl Brine (400 g/l), after rolling at 180° C. for 6 hours. Foaming agent concentration of 10 L/m³.

| RESULTS | Base Fluid 10 L/m³ Foaming agent, contaminated with NaCl brine (50 L/m³) | |
|---|---|---|
| | B.R. | A.R. 180° C. 6 h |
| Fluid density, (g/cm³) | 0.5 | 0.44 |
| Bulk Viscosity. (cP) | 106 | 60 |
| Plastic Viscosity, (cP) | 60 | 43 |
| Yield Strength, (lb/100 ft²) | 92 | 34 |
| Reading 600, (lb/100 ft²) | 212 | 120 |
| Reading 300, (lb/100 ft²) | 152 | 77 |
| Reading 200, (lb/100 ft²) | 110 | 60 |
| Reading 100, (lb/100 ft²) | 100 | 39 |
| Reading 6, (lb/100 ft²) | 34 | 6 |
| Reading 3, (lb/100 ft²) | 26 | 4 |
| Gel 10'/10", (lb/100 ft²) | 28/28 | 5/7 |
| API Filtering, (cm³) | 6.6 | 6.2 |
| Fluid pH | 9.34 | 8.47 |
| Filtered pH | 9.58 | 9.6 |
| Half-life (drained), hours | 5 hours | — |

TABLE 2.9

Density and rheological properties @ 50° C. of the water-based inhibited polymeric foamed fluid object of this invention freshly prepared in the laboratory contaminated with 50 L/m³ of NaCl Brine (400 g/l), after rolling at 180° C. for 6 hours. Foaming agent concentration of 15 L/m³.

| RESULTS | Base Fluid 15 L/m³ Foaming agent, contaminated with NaCl brine (50 L/m³) | |
|---|---|---|
| | B.R. | A.R. 180° C. 6 h |
| Fluid density, (g/cm³) | 0.42 | 0.42 |
| Bulk Viscosity. (cP) | 114 | 77 |
| Plastic Viscosity, (cP) | 52 | 48 |
| Yield Strength, (lb/100 ft²) | 124 | 58 |
| Reading 600, (lb/100 ft²) | 228 | 154 |
| Reading 300, (lb/100 ft²) | 176 | 106 |
| Reading 200, (lb/100 ft²) | 150 | 85 |
| Reading 100, (lb/100 ft²) | 120 | 56 |
| Reading 6, (lb/100 ft²) | 38 | 12 |
| Reading 3, (lb/100 ft²) | 30 | 8 |
| Gel 10'/10", (lb/100 ft²) | 30/34 | 7/11 |
| API Filtering, (cm³) | 6.4 | 6.4 |
| Fluid pH | 9.49 | 8.4 |
| Filtered pH | 10 | 8.8 |
| Half-life (drained), hours | 10 | — |

TABLE 2.10

Density and rheological properties @ 50° C. of the water-based inhibited polymeric foamed fluid object of this invention freshly prepared in the laboratory contaminated with 50 L/m³ of NaCl Brine (400 g/l), after rolling at 180° C. for 6 hours. Foaming agent concentration of 20 L/m³.

| RESULTS | Base Fluid 20 L/m³ Foaming agent, contaminated with NaCl brine (50 L/m³) | |
|---|---|---|
| | B.R. | A.R. 180° C. 6 h |
| Fluid density, (g/cm³) | 0.47 | 0.43 |
| Bulk Viscosity. (cP) | 115 | 80 |
| Plastic Viscosity, (cP) | 50 | 57 |
| Yield Strength, (lb/100 ft²) | 130 | 46 |
| Reading 600, (lb/100 ft²) | 230 | 160 |
| Reading 300, (lb/100 ft²) | 180 | 103 |

TABLE 2.10-continued

Density and rheological properties @ 50° C. of the water-based inhibited polymeric foamed fluid object of this invention freshly prepared in the laboratory contaminated with 50 L/m³ of NaCl Brine (400 g/l), after rolling at 180° C. for 6 hours. Foaming agent concentration of 20 L/m³.

| | Base Fluid 20 L/m³ Foaming agent, contaminated with NaCl brine (50 L/m³) | |
|---|---|---|
| RESULTS | B.R. | A.R. 180° C. 6 h |
| Reading 200, (lb/100 ft²) | 150 | 81 |
| Reading 100, (lb/100 ft²) | 118 | 53 |
| Reading 6, (lb/100 ft²) | 44 | 10 |
| Reading 3, (lb/100 ft²) | 36 | 8 |
| Gel 10'/10", (lb/100 ft²) | 24/32 | 8/9 |
| API Filtering, (cm³) | 5.2 | 6.9 |
| Fluid pH | 9.44 | 8.23 |
| Filtered pH | 9.61 | 9.7 |
| Half-life (drained), hours | 11 | — |

TABLE 2.11

Density and rheological properties @ 50° C. of the water-based inhibited polymeric foamed fluid object of this invention freshly prepared in the laboratory contaminated with 20° API heavy crude oil (50 L/m³), after rolling at 180° C. for 6 hours. Foaming agent concentration of 10 L/m³.

| | Base Fluid 10 L/m³ Foaming agent, contaminated with crude oil (50 L/m³) | |
|---|---|---|
| RESULTS | B.R. | A.R. 180° C. 6 h |
| Fluid density, (g/cm³) | 0.4 | 0.59 |
| Bulk Viscosity. (cP) | 160 | 55 |
| Plastic Viscosity, (cP) | 76 | 48 |
| Yield Strength, (lb/100 ft²) | 168 | 14 |
| Reading 600, (lb/100 ft²) | 320 | 110 |
| Reading 300, (lb/100 ft²) | 244 | 62 |
| Reading 200, (lb/100 ft²) | 200 | 56 |
| Reading 100, (lb/100 ft²) | 156 | 35 |
| Reading 6, (lb/100 ft²) | 56 | 6 |
| Reading 3, (lb/100 ft²) | 44 | 4 |
| Gel 10'/10", (lb/100 ft²) | 44/46 | 5/7 |
| API Filtering, (cm³) | 5.6 | 4.8 |
| Fluid pH | 9.64 | 8.97 |
| Filtered pH | 9.62 | 9.42 |
| Half-life (drained), hours | 15 | — |

TABLE 2.12

Density and rheological properties @50° C. of the water-based inhibited polymeric foamed fluid object of this invention freshly prepared in the laboratory contaminated with 20° API heavy crude oil (50 L/m³), after rolling at 180° C. for 6 hours. Foaming agent concentration of 15 L/m³.

| | Base Fluid 15 L/m³ Foaming agent, contaminated with crude oil (50 L/m³) | |
|---|---|---|
| RESULTS | B.R. | A.R. 180° C. 6 h |
| Fluid density, (g/cm³) | 0.41 | 0.46 |
| Bulk Viscosity. (cP) | 170 | 48 |
| Plastic Viscosity, (cP) | 90 | 36 |
| Yield Strength, (lb/100 ft²) | 160 | 24 |
| Reading 600, (lb/100 ft²) | 340 | 96 |
| Reading 300, (lb/100 ft²) | 250 | 60 |
| Reading 200, (lb/100 ft²) | 204 | 42 |
| Reading 100, (lb/100 ft²) | 156 | 25 |
| Reading 6, (lb/100 ft²) | 52 | 7 |
| Reading 3, (lb/100 ft²) | 40 | 4 |
| Gel 10'/10", (lb/100 ft²) | 42/46 | 3/5 |
| API Filtering, (cm³) | 5 | 5 |
| Fluid pH | 9.8 | 9.5 |
| Filtered pH | 9.88 | 9.57 |
| Half-life (drained), hours | 16 hours | — |

TABLE 2.13

Density and rheological properties @ 50° C. of the water-based inhibited polymeric foamed fluid object of this invention freshly prepared in the laboratory contaminated with 20° API heavy crude oil (50 L/m³), after rolling at 180° C. for 6 hours. Foaming agent concentration of 20 L/m³.

| | Base Fluid 20 L/m³ Foaming agent, contaminated with crude oil (50 L/m³) | |
|---|---|---|
| RESULTS | B.R. | A.R. 180° C. 6 h |
| Fluid density, (g/cm³) | 0.40 | 0.45 |
| Bulk Viscosity. (cP) | 180 | 70 |
| Plastic Viscosity, (cP) | 50 | 53 |
| Yield Strength, (lb/100 ft²) | 260 | 34 |
| Reading 600, (lb/100 ft²) | 360 | 140 |
| Reading 300, (lb/100 ft²) | 310 | 87 |
| Reading 200, (lb/100 ft²) | 252 | 65 |
| Reading 100, (lb/100 ft²) | 196 | 39 |
| Reading 6, (lb/100 ft²) | 70 | 7 |
| Reading 3, (lb/100 ft²) | 54 | 5 |
| Gel 10'/10", (lb/100 ft²) | 54/60 | 6/7 |
| API Filtering, (cm³) | 5 | 4 |
| Fluid pH | 9.98 | 8.89 |
| Filtered pH | 9.65 | 9.69 |
| Half-life (drained), hours | 18 | — |

Rock-Water-Based foamed fluid Interaction tests were also carried out for the following formulations:

Formulation 1: Base Fluid with 10 L/m³ of foaming agent.

Formulation 2: Base Fluid with 15 L/m³ of foaming agent.

Formulation 3: Base Fluid with 20 L/m³ of foaming agent.

The results of said tests are shown in Table 2.14, wherein Linear Swelling (expressed as %) and Dispersion (expressed as %) were performed with a drill cut sample with CEC=28 meq/100 g clay.

TABLE 2.14

Rock-Water-Based foamed fluid Interaction tests.

| Formulation | 1 | 2 | 3 |
|---|---|---|---|
| Spread (%) | 24.6 | 24.8 | 17.0 |
| Lubricity Ratio | 0.2289 | 0.2166 | 0.2136 |
| Linear Swelling (%) | — | 15.82 | — |

Figure 2:
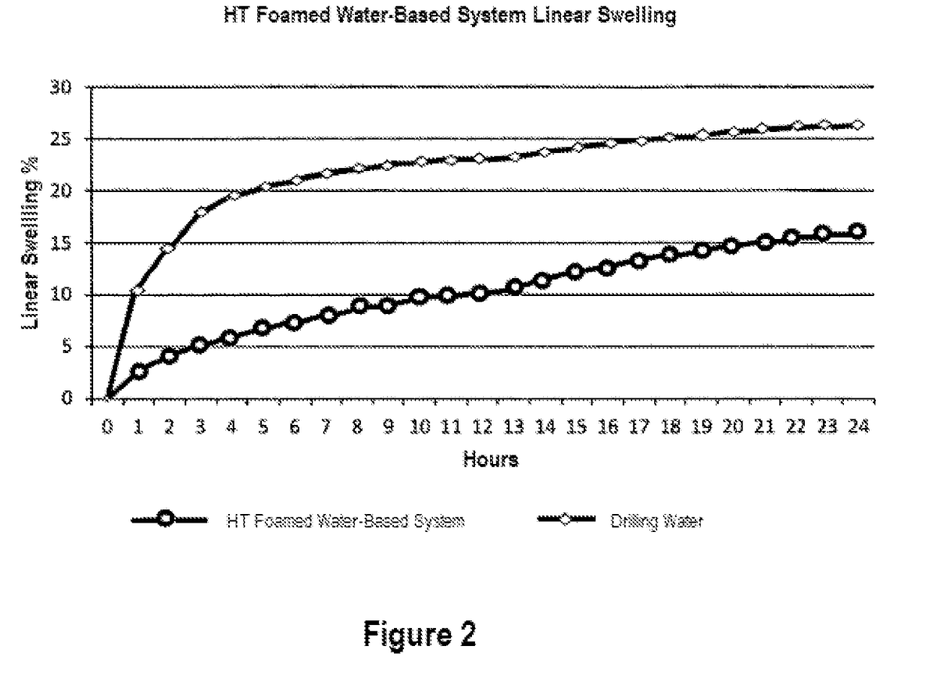
FIG. 2. Graph of the Linear Swelling percentage with respect to the time measured in hours, for Formulation 2, Base Fluid with 15 $L/m^3$ of foaming agent (HT Water-Based Foamed System) in a comparative way against Drilling Water.

FIG. 2 illustrates the percentage of Linear Swelling with respect to the time measured in hours, for Formulation 2, that is, for the formulation of Base Fluid with 15 L/m³ of foaming agent (HT Water-Based Foamed System) and for Drilling Water.

COMPARATIVE EXAMPLES

Comparative Example 1

To evaluate the advantage of the fluid and system object of the invention against similar systems (ultralight fluids), 3 typical formulations of ultralight fluids were evaluated before and after rolling at 150° C. and were compared with the fluid of the system object of the invention before and after rolling at 180° C., as follows:

Foamed fluid is prepared, the order of addition, the additive concentrations, the stirring times and the stirring rate are listed in the following table:

TABLE 3.1

Ultralight Systems Formulations vs System Object of the Invention

| Formulation Used | 1 | 2 | 3 | System object of the invention | Stirring time (min) | Stirring rate (rpm) |
|---|---|---|---|---|---|---|
| Drilling Water, $L/m^3$ | 960 | 960 | 960 | 960 | — | 7500 |
| Stabilizing Agent, $kg/m^3$ | 40 | 40 | 40 | 30 | 20 | 7500 |
| Viscosifying agent, $kg/m^3$ | 2 | 2 | 2 | 2 | 10 | 7500 |
| Filtering reducing agent, $kg/m^3$ | 4 | 4 | 3 | 8 | 20 | 7500 |
| Shale inhibiting agent, $kg/m^3$ | 3.5 | 6 | 4 | 6 | 10 | 7500 |
| Alkalizing agent and acid gas sequestering agent, $L/m^3$ | 1.5 | 2 | 2.5 | 2 | 10 | 7500 |
| Thermal Stabilizer, $kg/m^3$ | 4 | 8 | 10 | 17.5 | 20 | 7500 |
| Foaming Agent, $L/m^3$ | 14 | 14 | 14 | 15 | 30 | 7500 |

Remarks:
1 to 3=Ultralight System Formulations,
Stabilizing Agent=Bentonite, for formulations 1 to 3,
Shale Inhibiting Agent 1=Mixture of polyacrylates and polyacrylamides for formulations 1 to 3,
Alkalizing Agent 1=MEA for formulations 1 to 3,
Thermal Stabilizer=Diallyl dimethyl ammonium polychloride for formulations 1 to 3.

The fluids prepared are subject to the following tests:
Density: Obtained at room temperature and atmospheric pressure by weighing a volume of 100 $cm^3$ of the water-based polymeric inhibited foamed fluid, using a grains scale approximating to 0.1 g and a 100 $cm^3$ test tube, as detailed above.
Half-Life Time: Measuring the time it takes for 50% of the liquid phase contained in the foam to drain, the initial foam volume was 100 $cm^3$.
Rheological properties: Measuring the L600, L300, L6 and L3 in a concentric cylinder rotational viscometer at a temperature of 50° C. and determining the parameters of the Bingham Plastics rheological model (Plastic viscosity and yield point).
Filtering Loss: Measuring the volume of foamed fluid that filters, over a period of 30 minutes, through a filter paper with permeability of 2 darcys (using a low pressure API cell).
Temperature Effect: Subjecting the foamed fluids to a rolling process at a temperature of 150 or 180° C. for a time of 18 hours, the rolling cells must be pressurized to 150 psi before rolling to avoid damage to the fluids due to the boiling effects. After rolling, the samples must be analyzed for density, rheology and loss of filtering as detailed above.
$CO_2$ contamination: The foamed fluid is pressurized with 150 psi $CO_2$ and subjected to a rolling process at a temperature of 150 or 180° C. for 6 hours. After rolling, the samples must be analyzed for density, rheology and loss of filtering, as detailed above.
Contamination with Brine: The foamed fluid is contaminated with 5% vol. of a sodium chloride brine (40 g/100 mL) and analyzed, before and after rolling at 150 or 180° C. for 18 hours, for density, rheology and loss of filtering as detailed above.

Test Results

In the following Tables 3.2, 3.3, 3.4 and 3.5, the results and data obtained after carrying out the corresponding tests are presented.

TABLE 3.2

Test Results of Ultralight Systems vs System Object of the Invention, freshly prepared.

| RESULTS | Ultralight System #1 B.R. | Ultralight System #2 B.R. | Ultralight System #3 B.R. | System Object of the Invention B.R. |
|---|---|---|---|---|
| Fluid density, ($g/cm^3$) | 0.45 | 0.50 | 0.49 | 0.52 |
| Bulk Viscosity. (cP) | 61.5 | 53 | 58 | 137.5 |
| Plastic Viscosity, (cP) | 35 | 33 | 37 | 66 |
| Yield Strength, (lb/100 $ft^2$) | 53 | 40 | 42 | 143 |
| Reading 600, (lb/100 $ft^2$) | 123 | 106 | 116 | 275 |
| Reading 300, (lb/100 $ft^2$) | 88 | 73 | 79 | 209 |
| Reading 6, (lb/100 $ft^2$) | 17 | 14 | 12 | 45 |
| Reading 3, (lb/100 $ft^2$) | 14 | 10 | 10 | 38 |
| Gel 10'/10", (lb/100 $ft^2$) | — | — | — | 36/39 |
| API Filtering, ($cm^3$) | 10.2 | 10.0 | 8.0 | 7.8 |
| Fluid pH | 9.0 | 9.7 | 10.6 | 9.8 |
| Half-life (drained), hours | 5.3 | 7 | 3 | 13 |

TABLE 3.3

Test Results of Thermal Effect in Ultralight Systems (at 150° C.) vs System Object of the Invention (at 180° C.).

| RESULTS | Ultralight System #1 A.R. 150° C. 6 h | Ultralight System #2 A.R. 150° C. 6 h | Ultralight System #3 A.R. 150° C. 6 h | System Object of the Invention A.R. 180° C. 6 h |
|---|---|---|---|---|
| Fluid density, (g/cm$^3$) | — | — | — | 0.34 |
| Bulk Viscosity. (cP) | 48.5 | 55.5 | 57.5 | 97.5 |
| Plastic Viscosity, (cP) | 31 | 34 | 40 | 65 |
| Yield Strength, (lb/100 ft$^2$) | 35 | 43 | 35 | 65 |
| Reading 600, (lb/100 ft$^2$) | 97 | 111 | 115 | 195 |
| Reading 300, (lb/100 ft$^2$) | 66 | 77 | 75 | 130 |
| Reading 6, (lb/100 ft$^2$) | 9 | 15 | 8 | 13 |
| Reading 3, (lb/100 ft$^2$) | 6 | 11 | 7 | 10 |
| Gel 10'/10", (lb/100 ft$^2$) | — | — | — | 10/10 |
| API Filtering, (cm$^3$) | 10.2 | 10.0 | 8.0 | 6.4 |

TABLE 3.4

Brine Contamination Test Results in Ultralight Systems (at 150° C.) vs System of the Invention (at 180° C.).

| RESULTS | Ultralight System #1 A.R. 150° C. 6 h | Ultralight System #2 A.R. 150° C. 6 h | Ultralight System #3 A.R. 150° C. 6 h | System Object of the Invention A.R. 180° C. 6 h |
|---|---|---|---|---|
| Fluid density, (g/cm$^3$) | — | — | — | 0.35 |
| Bulk Viscosity. (cP) | 55 | 57.5 | 42.5 | 106 |
| Plastic Viscosity, (cP) | 36 | 40 | 27 | 72 |
| Yield Strength, (lb/100 ft$^2$) | 38 | 35 | 31 | 68 |
| Reading 600, (lb/100 ft$^2$) | 110 | 115 | 85 | 212 |
| Reading 300, (lb/100 ft$^2$) | 74 | 75 | 58 | 140 |
| Reading 6, (lb/100 ft$^2$) | 14 | 12 | 11 | 10 |
| Reading 3, (lb/100 ft$^2$) | 11 | 9 | 8 | 7 |
| Gel 10'/10", (lb/100 ft$^2$) | — | — | — | 7/12 |
| API Filtering, (cm$^3$) | 10.1 | 10.0 | 9.1 | 7.8 |

TABLE 3.5

$CO_2$ Contamination Test Results in Ultralight Systems (at 150° C.) vs System of the Invention (at 180° C.).

| RESULTS | Ultralight System #1 A.R. 150° C. 6 h | Ultralight System #2 A.R. 150° C. 6 h | Ultralight System #3 A.R. 150° C. 6 h | System Object of the Invention A.R. 180° C. 6 h |
|---|---|---|---|---|
| Fluid density, (g/cm$^3$) | — | — | — | 0.35 |
| Bulk Viscosity. (cP) | 59.5 | 58.5 | 58 | 106 |
| Plastic Viscosity, (cP) | 40 | 47 | 40 | 72 |
| Yield Strength, (lb/100 ft$^2$) | 39 | 23 | 36 | 68 |
| Reading 600, (lb/100 ft$^2$) | 119 | 117 | 116 | 212 |
| Reading 300, (lb/100 ft$^2$) | 79 | 70 | 76 | 140 |
| Reading 6, (lb/100 ft$^2$) | 12 | 10 | 12 | 10 |
| Reading 3, (lb/100 ft$^2$) | 8 | 8 | 9 | 7 |
| Gel 10'/10", (lb/100 ft$^2$) | — | — | — | 7/12 |
| API Filtering, (cm$^3$) | 10.2 | 9.0 | 9.4 | 7.6 |

Analysis of the Results.

The System Object of the Invention shows greater foam stability than typical Ultralight Systems, having a half-life greater than 10 hours, as shown in Table 3.2.

The System Object of the Invention shows greater thermal stability after being rolled at 180° C. for 6 hours than typical Ultralight Systems after being rolled at 150° C. for 6 hours, by maintaining acceptable rheological values and lower filtered volume, as shown in Table 3.3.

The System Object of the Invention shows resistance to Contamination with Brine after rolling at 180° C. for 6 hours, compared to typical Ultralight Systems after rolling at 150° C. for 6 hours, by maintaining acceptable rheological values and lower filtered volume, as shown in Table 3.4.

The System Object of the Invention shows resistance to $CO_2$ Contamination after rolling at 180° C. for 6 hours, compared to typical Ultralight Systems after rolling at 150° C. for 6 hours, by maintaining acceptable rheological values and lower filtered volume, as shown in Table 3.5.

The System Object of the Invention shows excellent performance in its properties before and after rolling at 180° C. It has greater foam stability than typical Ultralight Systems, thermal stability and resistance to contaminants at 180° C.

Comparative Example 2

To evaluate the stability behavior of the foamed fluid of the present invention with different viscosifying additives, shale inhibitors and thermal stabilizers, foamed fluid formulations are evaluated before and after rolling at 180° C.

The base fluid is prepared, the order of addition, the quantity, stirring time and stirring rate are listed in the following table:

TABLE 4.1

Formulations of Foamed Systems vs System Object of the Invention.

| FORMULATION | A | B | C | D | E | F | System Object of the Invention |
|---|---|---|---|---|---|---|---|
| Drilling Water, L/m$^3$ | 960 | 960 | 960 | 960 | 960 | 960 | 960 |
| Stabilizing Agent, kg/m$^3$ | 30 | 30 | 30 | 30 | 30 | 30 | 30 |
| Viscosifying agent 1, kg/m$^3$ | 3 | 2 | — | — | 2 | 2 | 2 |
| Viscosifying agent 2, kg/m$^3$ | — | 6 | — | — | — | — | — |
| Shale inhibiting agent 1, kg/m$^3$ | 6 | — | 6 | — | 6 | — | 6 |
| Shale inhibiting agent 2, kg/m$^3$ | — | 30 | 30 | 30 | — | 30 | — |

TABLE 4.1-continued

Formulations of Foamed Systems vs System Object of the Invention.

| FORMULATION | A | B | C | D | E | F | System Object of the Invention |
|---|---|---|---|---|---|---|---|
| Filtering reducing agent, kg/m³ | — | — | 8 | 8 | 8 | 8 | 8 |
| Alkalizing agent 1, L/m³ | 2 | 2 | 2 | 2 | 2 | 2 | 2 |
| Thermal Stabilizer, kg/m³ | 9 | 17.5 | 17.5 | 17.5 | 17.5 | 17.5 | 17.5 |
| Foaming Agent, L/m³ | 15 | 15 | 15 | 15 | 15 | 15 | 15 |

Remarks:

A through F=Foamed System Formulations

Stabilizing Agent=Bentonite, for formulations from A to F

Viscosifying Agent 1=Xanthan Gum for formulations A, B, E and F

Viscosifying Agent 2=Polyanionic Cellulose for formulation B

Shale Inhibitor 1=KCl for formulations, A, C and E

Shale Inhibitor 2=Mixture of Polyacrylates and Polyacrylates for formulations B, C, D and F Alkalinizing Agent 1=MEA for formulations A to F Thermal Stabilizer=Diallyl dimethyl ammonium polychloride for formulations A to F.

Test Results.

In the following Tables 4.2 and 4.3, the results and data obtained after carrying out the corresponding tests are presented.

TABLE 4.2

Test Results of freshly prepared Systems.

| RESULTS | A | B | C | D | E | F | System Object of the Invention |
|---|---|---|---|---|---|---|---|
| Freshly prepared fluid | B.R. | B.R. | B.R. | B.R. | B.R. | B.R. | B.R. |
| Fluid density, (g/cm³) | 0.56 | 0.47 | 0.48 | 0.37 | 0.48 | 0.52 | 0.47 |
| Bulk Viscosity. (cP) | 60 | 123 | 135 | 149 | 141 | 139 | 172 |
| Plastic Viscosity, (cP) | 28 | 58 | 60 | 79 | 68 | 70 | 98 |
| Yield Strength, (lb/100 ft²) | 64 | 130 | 150 | 140 | 146 | 138 | 148 |
| Reading 600, (lb/100 ft²) | 120 | 246 | 270 | 298 | 282 | 278 | 344 |
| Reading 300, (lb/100 ft²) | 92 | 188 | 210 | 219 | 214 | 208 | 246 |
| Reading 200, (lb/100 ft²) | 80 | 163 | 170 | 186 | 180 | 174 | 190 |
| Reading 100, (lb/100 ft²) | 69 | 128 | 130 | 140 | 137 | 133 | 166 |
| Reading 6, (lb/100 ft²) | 30 | 46 | 40 | 41 | 45 | 46 | 60 |
| Reading 3, (lb/100 ft²) | 25 | 36 | 30 | 32 | 35 | 35 | 44 |
| Gel 10'/10", (lb/100 ft²) | 24/26 | 25/41 | 30/35 | 29/34 | 34/36 | 34/38 | 46/46 |
| API Filtering, (cm³) | 13.8 | 7.5 | 7.6 | 7.0 | 7.0 | 7.4 | 6.4 |
| Fluid pH | 9.75 | 10.24 | 10 | 10.09 | 9.94 | 9.92 | 10.1 |
| Half-life (drained), hours | 24 | 22 | 12 | 5 | 15 | 13 | 11.5 |

TABLE 4.3

Test Results of Thermal Effect at 180° C.

| RESULTS | A | B | C | D | E | F | System Object of the Invention |
|---|---|---|---|---|---|---|---|
| Freshly prepared fluid | A.R. 180° C. 18 h | A.R. 180° C. 18 h | A.R. 180° C. 18 h | A.R. 180° C. 18 h | A.R. 180° C. 18 h | A.R. 180° C. 18 h | A.R. 180° C. 18 h |
| Fluid density, (g/cm³) | 0.64 | 0.45 | 0.37 | 0.41 | 0.32 | 0.47 | 0.41 |
| Bulk Viscosity. (cP) | 45 | 40 | 63 | 25 | 65 | 64 | 105 |
| Plastic Viscosity, (cP) | 27 | 26 | 43 | 12 | 46 | 47 | 89 |
| Yield Strength, (lb/100 ft²) | 36 | 28 | 40 | 26 | 38 | 34 | 32 |
| Reading 600, (lb/100 ft²) | 90 | 80 | 126 | 50 | 130 | 128 | 210 |
| Reading 300, (lb/100 ft²) | 63 | 54 | 83 | 38 | 84 | 81 | 121 |
| Reading 200, (lb/100 ft²) | 51 | 44 | 65 | 33 | 66 | 63 | 90 |
| Reading 100, (lb/100 ft²) | 58 | 32 | 45 | 27 | 43 | 40 | 54 |
| Reading 6, (lb/100 ft²) | 15 | 9 | 11 | 10 | 8 | 8 | 15 |
| Reading 3, (lb/100 ft²) | 13 | 7 | 8 | 8 | 6 | 6 | 6 |
| Gel 10'/10", (lb/100 ft²) | 14/14 | 9/11 | 8/8 | 5/7 | 6/7 | 6/7 | 5/6 |
| API Filtering, (cm³) | 55.0 | 40.0 | 10.0 | 33.0 | 9.1 | 8.0 | 6.4 |
| Fluid pH | 9.0 | 8.0 | 9.2 | 8.8 | 9.1 | 9.1 | 9.2 |

Analysis of the Results.

The System Object of the Invention shows good foam stability compared to freshly prepared foamed systems with different shale inhibitor additives, viscosifiers and thermal stabilizers, having a drainage time of more than 10 hours; and it shows better rheological behavior and filtration control compared to freshly prepared foamed systems, as shown in Table 4.2.

The System Object of the Invention shows greater thermal stability after rolling at 180° C. for 6 hours than the Foamed Systems prepared with different shale inhibiting additives, viscosifiers and thermal stabilizers after rolling at 180° C. for 6 hours, by maintaining acceptable rheologicals values and less filtering, as shown in Table 4.3.

The System Object of the Invention shows excellent performance in its properties before and after rolling at 180° C. It has foam stability similar to Foamed Systems prepared with different shale inhibitor additives, viscosifiers and thermal stabilizers, and better thermal stability, better rheological values and better filtration control after rolling at 180° C.

Comparative Example 3

The following evaluation was developed in order to verify the performance of the Fluid and System of the present invention under conditions of high temperature and/or presence of contaminants, formulating the System with alternative foaming agents; in order to compare, based on results, its thermal stability and its resistance to common contaminants.

Test Formulations:

In accordance with the aforementioned, the formulations used in this series of tests are shown below:

TABLE 5

Formulation for fluid prepared with different foaming agents.

| Formulation Product | 0 | 1 | 2 | Stirring (min) |
|---|---|---|---|---|
| | | Concentration | | |
| Drilling Water, L/m$^3$ | 960 | 960 | 960 | — |
| Stabilizing Agent, kg/m$^3$ | 30 | 30 | 30 | 20 |
| Viscosifying agent, kg/m$^3$ | 2 | 2 | 2 | 10 |
| Filtering Net. Agent, kg/m$^3$ | 8 | 8 | 8 | 20 |
| Shale inhibiting agent, kg/m$^3$ | 6 | 6 | 6 | 10 |
| Thermal Stabilizer, kg/m$^3$ | 7.5 | 7.5 | 7.5 | 20 |
| Foaming Agent of the System Object of the Invention, L/m$^3$ | 15 | — | — | 45 |
| Alternate Foaming Agent 1, L/m$^3$ | — | 15 | — | 45 |
| Alternate Foaming Agent 2, L/m$^3$ | — | — | 15 | 45 |

Remarks:
Stabilizing Agent=Bentonite, for formulations 0 to 2,
Viscosifying Agent=Xanthan Gum for formulations 0 to 2,
Shale Inhibitor=Mixture of polyacrylates and polyacrylamides for formulations 0 to 2,
Alkalizing Agent=MEA for formulations 0 to 2,
Thermal Stabilizer=Diallyl dimethyl ammonium polychloride polychloride for formulations 0 to 2,
Alternate Foaming Agent 1=Foaming agent based on Lauryl ethoxy sodium sulfate 27%,
Alternate Foaming Agent 2=Foaming agent based on sulphated ethoxylated alcohol.

Test Results:

After preparing the test fluids, according to the formulations established in Table 5, and having carried out the procedures and analyzes indicated in the "Basis of Test Design" section, Tables 5.1 to 5.7 show the results of the tests using different foaming agents. In said tables, the term "B.R." refers to "Before Rolling", while the term "A.R." refers to "After Rolling for 6 hours at 180° C.".

TABLE 5.1

Test Results of the System prepared with formulation 0.

| | Base Fluid | | Contamination with $CO_2$ | Contamination with Brine | | Contamination with Crude Oil | |
|---|---|---|---|---|---|---|---|
| Formulation 0 Test Results | B.R. | A.R. | A.R. | B.R. | A.R. | B.R. | A.R. |
| Fluid density, (g/cm$^3$) | 0.47 | 0.41 | 0.46 | 0.42 | 0.42 | 0.41 | 0.46 |
| Bulk Viscosity. (cP) | 172 | 105 | 69 | 114 | 77 | 170 | 48 |
| Plastic Viscosity, (cP) | 98 | 89 | 48 | 52 | 48 | 90 | 36 |
| Yield Strength, (lb/100 ft$^2$) | 148 | 32 | 42 | 124 | 58 | 160 | 24 |
| Reading 600, (lb/100 ft$^2$) | 344 | 210 | 138 | 228 | 154 | 340 | 96 |
| Reading 300, (lb/100 ft$^2$) | 246 | 121 | 90 | 176 | 106 | 250 | 60 |
| Reading 200, (lb/100 ft$^2$) | 190 | 90 | 70 | 150 | 85 | 204 | 42 |
| Reading 100, (lb/100 ft$^2$) | 166 | 54 | 43 | 120 | 56 | 156 | 25 |
| Reading 6, (lb/100 ft$^2$) | 60 | 15 | 10 | 38 | 12 | 52 | 7 |
| Reading 3, (lb/100 ft$^2$) | 44 | 6 | 5 | 30 | 8 | 40 | 4 |
| Gel 10'/10", (lb/100 ft$^2$) | 46/46 | 5/6 | 5/7 | 30/34 | 7/11 | 42/46 | 3/5 |
| API Filtering, (cm$^3$) | 6.4 | 6.4 | 7.8 | 6.4 | 6.4 | 5 | 5 |
| Fluid pH | 10.1 | 9.18 | 9.2 | 9.49 | 8.4 | 9.8 | 9.5 |
| Filtered pH | 10 | 10 | 9.36 | 10 | 8.8 | 9.88 | 9.58 |
| Half-life (drained), hours | 11.5 | — | — | 10 | — | 16 | — |

TABLE 5.2

Test Results of the System prepared with formulation 1.

| Formulation 1 Test Results | Base Fluid B.R. | Base Fluid A.R. | Contamination with $CO_2$ A.R. | Contamination with Brine B.R. | Contamination with Brine A.R. | Contamination with Crude Oil B.R. | Contamination with Crude Oil A.R. |
|---|---|---|---|---|---|---|---|
| Fluid density, (g/cm$^3$) | 0.40 | 0.52 | 0.48 | 0.46 | 0.54 | 0.47 | 0.66 |
| Bulk Viscosity. (cP) | 190 | 50 | 40 | 145 | 27.5 | 175 | 30 |
| Plastic Viscosity, (cP) | 76 | 42 | 39 | 104 | 22 | 70 | 26 |
| Yield Strength, (lb/100 ft$^2$) | 228 | 16 | 2 | 82 | 11 | 210 | 8 |
| Reading 600, (lb/100 ft$^2$) | 380 | 100 | 80 | 290 | 55 | 350 | 60 |
| Reading 300, (lb/100 ft$^2$) | 304 | 58 | 41 | 186 | 33 | 280 | 34 |
| Reading 200, (lb/100 ft$^2$) | 252 | 44 | 31 | 163 | 25 | 240 | 25 |
| Reading 100, (lb/100 ft$^2$) | 190 | 27 | 19 | 130 | 16 | 184 | 15 |
| Reading 6, (lb/100 ft$^2$) | 70 | 4 | 4 | 48 | 5 | 66 | 4 |
| Reading 3, (lb/100 ft$^2$) | 52 | 3 | 3 | 40 | 4 | 52 | 3 |
| Gel 10'/10", (lb/100 ft$^2$) | 54/54 | 4/5 | 4/5 | 30/30 | 5/6 | 52/56 | 4/5 |
| API Filtering, (cm$^3$) | 6.2 | 7.6 | 7.6 | 5.8 | 9 | 5.6 | 5.4 |
| Fluid pH | 9.94 | 8.9 | 8.85 | 9.43 | 8.32 | 9.97 | 8.82 |
| Filtered pH | 9.82 | 9.71 | 9.71 | 9.86 | 9.68 | 9.91 | 9.57 |
| Half-life (drained), hours | 12 | — | — | 12 | — | 12 | — |

TABLE 5.3

Test Results of the System prepared with formulation 2.

| Formulation 2 Test Results | Base Fluid B.R. | Base Fluid A.R. | Contamination with $CO_2$ A.R. | Contamination with Brine B.R. | Contamination with Brine A.R. | Contamination with Crude Oil B.R. | Contamination with Crude Oil A.R. |
|---|---|---|---|---|---|---|---|
| Fluid density, (g/cm$^3$) | 0.42 | 0.40 | 0.30 | 0.46 | 0.40 | 0.46 | 0.49 |
| Bulk Viscosity. (cP) | 130 | 67.5 | 62.5 | 110 | 42.5 | 110 | 47.5 |
| Plastic Viscosity, (cP) | 60 | 45 | 41 | 50 | 27 | 40 | 35 |
| Yield Strength, (lb/100 ft$^2$) | 140 | 45 | 43 | 120 | 31 | 140 | 25 |
| Reading 600, (lb/100 ft$^2$) | 260 | 135 | 125 | 220 | 85 | 220 | 95 |
| Reading 300, (lb/100 ft$^2$) | 200 | 90 | 84 | 170 | 58 | 180 | 60 |
| Reading 200, (lb/100 ft$^2$) | 178 | 75 | 65 | 146 | 48 | 164 | 44 |
| Reading 100, (lb/100 ft$^2$) | 144 | 50 | 44 | 114 | 35 | 122 | 27 |
| Reading 6, (lb/100 ft$^2$) | 58 | 11 | 10 | 48 | 11 | 54 | 6 |
| Reading 3, (lb/100 ft$^2$) | 44 | 8 | 7 | 38 | 9 | 41 | 5 |
| Gel 10'/10", (lb/100 ft$^2$) | 44/48 | 8/8 | 8/8 | 28/30 | 8/8 | 34/36 | 4/5 |
| API Filtering, (cm$^3$) | 7 | 7.2 | 7.4 | 6.2 | 16.6 | 6 | 5.8 |
| Fluid pH | 9.65 | 9.02 | 9.03 | 9.31 | 8.38 | 9.7 | 8.85 |
| Filtered pH | 9.71 | 9.62 | 9.58 | 9.68 | 9.6 | 9.56 | 9.48 |
| Half-life (drained), hours | 10 | — | — | 9 | — | 9 | — |

45

TABLE 5.4

Test Results of the Thermal Effect in the System formulated with different foaming agents before and after rolling for 6 hours at 180° C.

| Test Results | Formulation 0 - Base Fluid B.R. | Formulation 0 - Base Fluid A.R. | Formulation 1 - Base Fluid B.R. | Formulation 1 - Base Fluid A.R. | Formulation 2 - Base Fluid B.R. | Formulation 2 - Base Fluid A.R. |
|---|---|---|---|---|---|---|
| Fluid density, (g/cm$^3$) | 0.47 | 0.41 | 0.40 | 0.52 | 0.42 | 0.40 |
| Bulk Viscosity. (cP) | 172 | 105 | 190 | 50 | 130 | 67.5 |
| Plastic Viscosity, (cP) | 98 | 89 | 76 | 42 | 60 | 45 |
| Yield Strength, (lb/100 ft$^2$) | 148 | 32 | 228 | 16 | 140 | 45 |
| Reading 600, (lb/100 ft$^2$) | 344 | 210 | 380 | 100 | 260 | 135 |
| Reading 300, (lb/100 ft$^2$) | 246 | 121 | 304 | 58 | 200 | 90 |
| Reading 200, (lb/100 ft$^2$) | 190 | 90 | 252 | 44 | 178 | 75 |
| Reading 100, (lb/100 ft$^2$) | 166 | 54 | 190 | 27 | 144 | 50 |
| Reading 6, (lb/100 ft$^2$) | 60 | 15 | 70 | 4 | 58 | 11 |
| Reading 3, (lb/100 ft$^2$) | 44 | 6 | 52 | 3 | 44 | 8 |

TABLE 5.4-continued

Test Results of the Thermal Effect in the System formulated with different foaming agents before and after rolling for 6 hours at 180° C.

| Test Results | Formulation 0 - Base Fluid | | Formulation 1 - Base Fluid | | Formulation 2 - Base Fluid | |
|---|---|---|---|---|---|---|
| | B.R. | A.R. | B.R. | A.R. | B.R. | A.R. |
| Gel 10'/10", (lb/100 ft$^2$) | 46/46 | 5/6 | 54/54 | 4/5 | 44/48 | 8/8 |
| API Filtering, (cm$^3$) | 6.4 | 6.4 | 6.2 | 7.6 | 7 | 7.2 |
| Fluid pH | 10.1 | 9.18 | 9.94 | 8.9 | 9.65 | 9.02 |
| Filtered pH | 10 | 10 | 9.82 | 9.71 | 9.71 | 9.65 |
| Half-life (drained), hours | 11.5 | — | 12 | — | 10 | — |

TABLE 5.5

Test Results of the Thermal Effect in the System formulated with different foaming agents, contaminated with $CO_2$ after rolling for 6 hours at 180° C.

| Test Results | Formulation 0 Contamination with $CO_2$ A.R. | Formulation 1 Contamination with $CO_2$ A.R. | Formulation 2 Contamination with $CO_2$ A.R. |
|---|---|---|---|
| Fluid density, (g/cm$^3$) | 0.46 | 0.48 | 0.3 |
| Bulk Viscosity, (cP) | 69 | 40 | 62.5 |
| Plastic Viscosity, (cP) | 48 | 39 | 41 |
| Yield Strength, (lb/100 ft$^2$) | 42 | 2 | 43 |
| Reading 600, (lb/100 ft$^2$) | 138 | 80 | 125 |
| Reading 300, (lb/100 ft$^2$) | 90 | 41 | 84 |
| Reading 200, (lb/100 ft$^2$) | 70 | 31 | 65 |
| Reading 100, (lb/100 ft$^2$) | 43 | 19 | 44 |
| Reading 6, (lb/100 ft$^2$) | 10 | 4 | 10 |
| Reading 3, (lb/100 ft$^2$) | 5 | 3 | 7 |
| Gel 10'/10", (lb/100 ft$^2$) | 5/6 | 4/5 | 8/8 |
| API Filtering, (cm$^3$) | 7.8 | 7.6 | 7.4 |
| Fluid pH | 9.2 | 8.85 | 9.03 |
| Filtered pH | 9.36 | 9.71 | 9.58 |

TABLE 5.6

Test Results of the Thermal Effect in the System formulated with different foaming agents, contaminated with NaCl brine, before and after rolling for 6 hours at 180° C.

| Test Results | Formulation 0 Contamination with Brine | | Formulation 1 Contamination with Brine | | Formulation 2 Contamination with Brine | |
|---|---|---|---|---|---|---|
| | B.R. | A.R. | B.R. | A.R. | B.R. | A.R. |
| Fluid density, (g/cm$^3$) | 0.42 | 0.42 | 0.46 | 0.54 | 0.46 | 0.4 |
| Bulk Viscosity, (cP) | 114 | 77 | 145 | 27.5 | 110 | 42.5 |
| Plastic Viscosity, (cP) | 52 | 48 | 104 | 22 | 50 | 27 |
| Yield Strength, (lb/100 ft$^2$) | 124 | 58 | 82 | 11 | 120 | 31 |
| Reading 600, (lb/100 ft$^2$) | 228 | 154 | 290 | 55 | 220 | 85 |
| Reading 300, (lb/100 ft$^2$) | 176 | 106 | 186 | 33 | 170 | 58 |
| Reading 200, (lb/100 ft$^2$) | 150 | 85 | 163 | 25 | 146 | 48 |
| Reading 100, (lb/100 ft$^2$) | 120 | 56 | 130 | 16 | 114 | 35 |
| Reading 6, (lb/100 ft$^2$) | 38 | 12 | 48 | 5 | 48 | 11 |
| Reading 3, (lb/100 ft$^2$) | 30 | 8 | 40 | 4 | 38 | 9 |
| Gel 10'/10", (lb/100 ft$^2$) | 30/34 | 7/11 | 30/30 | 5/6 | 28/30 | 8/8 |
| API Filtering, (cm$^3$) | 6.4 | 6.4 | 5.8 | 9 | 6.2 | 16.6 |
| Fluid pH | 9.49 | 8.4 | 9.43 | 8.32 | 9.31 | 8.38 |
| Filtered pH | 10 | 8.8 | 9.86 | 9.68 | 9.68 | 9.6 |
| Half-time (drained), hours | 10 | — | 12 | — | 9 | — |

TABLE 5.7

Test Results of the Thermal Effect in the System formulated with different foaming agents, contaminated with crude oil, before and after rolling for 6 hours at 180° C.

|  | Formulation 0 Contamination with Crude Oil | | Formulation 1 Contamination with Crude Oil | | Formulation 2 Contamination with Crude Oil | |
| --- | --- | --- | --- | --- | --- | --- |
| Test Results | B.R. | A.R. | B.R. | A.R. | B.R. | A.R. |
| Fluid density, (g/cm$^3$) | 0.41 | 0.46 | 0.47 | 0.66 | 0.46 | 0.49 |
| Bulk Viscosity, (cP) | 170 | 48 | 175 | 30 | 110 | 47.5 |
| Plastic Viscosity, (cP) | 90 | 36 | 70 | 26 | 40 | 35 |
| Yield Strength, (lb/100 ft$^2$) | 160 | 24 | 210 | 8 | 140 | 25 |
| Reading 600, (lb/100 ft$^2$) | 340 | 96 | 350 | 60 | 220 | 95 |
| Reading 300, (lb/100 ft$^2$) | 250 | 60 | 280 | 34 | 180 | 60 |
| Reading 200, (lb/100 ft$^2$) | 204 | 42 | 240 | 25 | 164 | 44 |
| Reading 100, (lb/100 ft$^2$) | 156 | 25 | 184 | 15 | 122 | 27 |
| Reading 6, (lb/100 ft$^2$) | 52 | 7 | 66 | 4 | 54 | 6 |
| Reading 3, (lb/100 ft$^2$) | 40 | 4 | 52 | 3 | 41 | 5 |
| Gel 10'/10", (lb/100 ft$^2$) | 42/46 | 3/5 | 52/56 | 4/5 | 34/36 | 4/5 |
| API Filtering, (cm$^3$) | 5 | 5 | 5.6 | 5.4 | 6 | 5.8 |
| Fluid pH | 9.8 | 9.5 | 9.97 | 8.82 | 9.7 | 8.85 |
| Filtered pH | 9.88 | 9.58 | 9.91 | 9.57 | 9.56 | 9.48 |
| Half-time (drained), hours | 16 | — | 12 | — | 9 | — |

Test Results:
Thermal Effect:

Systems formulated with alternate foaming agents 1 and 2 do not have a good rheological performance after rolling for 6 hours at 180° C., since the system formulated with alternate foaming agents 1 and 2 have plastic viscosity (Vp) and yielding point (Pc) values 50% lower than the system formulated with the foaming agent object of the invention.

API filtering is similar in all cases, with values of the order of 6.2 to 7.2 cm$^3$ before and after rolling, which is considered satisfactory.

The half-life time of the 3 newly prepared formulations is 10 hours or more in all cases, which is considered satisfactory.

CO$_2$ Contamination:

The system formulated with alternative foaming agent 1 does not have a good rheological performance contaminated with CO$_2$ after rolling for 6 hours at 180° C., since it has Pc values after rolling of the order of 2 lb/100 ft$^2$, which indicates affectation of the system by the contaminant.

The system formulated with alternate foaming agent 2 has a good rheological performance after rolling for 6 hours at 180° C.

API filtering is similar in all cases, with values of the order of 7.4 to 7.8 cm$^3$ before and after rolling, which is considered satisfactory.

Contamination with Brine:

The system formulated with alternate foaming agent 1 does not have a good rheological performance contaminated with brine after rolling for 6 hours at 180° C., since it has Vp values in the order of 22 cP and Pc values after rolling in the order of 11 lb/100 ft$^2$, indicating contamination of the system by the contaminant.

The system formulated with alternate foaming agent 2 does not have a good rheological performance contaminated with brine after rolling for 6 hours at 180° C., since it has Vp values of the order of 27 cP and Pc values after rolling of the order of 31 lb/100 ft$^2$, indicating affectation of the system by the contaminant.

The API filtering of the system formulated with the alternative foaming agents 1 and 2 are slightly high after rolling, with values of 9 and 16.6 cm$^3$ respectively.

Contamination with Crude Oil:

The system formulated with alternate foaming agent 1 does not have a good rheological performance contaminated with crude oil after rolling for 6 hours at 180° C., since it has Vp values of the order of 26 cP and Pc values after rolling of the order of 8 lb/100 ft$^2$, indicating affectation of the system by the contaminant.

The system formulated with alternate foaming agent 2 has a rheological performance contaminated with crude oil after rolling for 6 hours at 180° C. similar to the system formulated with the foaming agent object of the invention.

API filtering is similar in all cases, with values of the order of 5.0 to 6.0 cm$^3$ before and after rolling, which is considered satisfactory.

The system formulated with alternate foaming agent 1 is the one that offers the least satisfactory results in terms of rheological behavior and resistance to contamination after rolling.

The system formulated with alternate foaming agent 2, has lower thermal stability and poor tolerance to contamination with brine.

Based on the results of this series of tests, the system formulated with the foaming agent object of the invention has greater thermal stability at 180° C. and better resistance to contaminants than the systems formulated with other foaming agents.

The present invention has been sufficiently described so that an ordinary skilled technician may reproduce and obtain the results mentioned in the present disclosure. However, any person skilled in the art falling within the present invention will be able to make modifications and substitutions without departing from the spirit of the invention as defined in the attached claims.

The invention claimed is:

1. A composition of a water-based foamed fluid for drilling depressed areas in oil and gas wells, the composition comprising:
   (i) a base fluid;
   (ii) a stabilizing agent comprising treated montmorillonite;
   (iii) a viscosifying agent comprising Xanthan gum with an average molecular weight of 2×10$^6$ g/mol;
   (iv) a filtering reducing agent;
   (v) a clay inhibiting agent;

(vi) an alkalizing agent and acid gas sequestering agent;
(vii) a thermal stabilizing agent comprising a polymer derived from an alkali metal salt of 2-acrylamide-2-methyl-propane sulfonic acid; and
(viii) a foaming agent comprising is a mixture of saturated fatty acids of the alkyl group of 10 carbon atoms to 14 carbon atoms with a range of 2 to 8 moles of ethylene oxide,
wherein the composition of the water-based foamed fluid has a thermal stability higher than 180° C.

2. The composition of claim 1, wherein the Xanthan gum is manufactured by fermentation of carbohydrates with generic *Xanthomonas* bacteria, wherein the *Xanthomonas* bacteria is selected from the group consisting of *Xanthomonas phaseoli, Xanthomonas mulvacearn, Xanthomonas campestris, Xanthomonas carotoe*, and *Xanthomonas translucean*.

3. The composition of claim 2, wherein the Xanthan gum is produced by *Xanthomona campestris*.

4. The composition of claim 1, wherein the filtering reducing agent is a copolymer having average molecular weight in a range from $2\times10^6$ to $4\times10^6$ g/mol and being from a group of polyacrylamides that comprises at least one member selected from the group consisting of acrylamides, N-substituted acryl-amides, methacrylamides, N-substituted methacrylamides, acrylates, methacrylates, N-vinyl amides, N-allyl amides, vinyl alcohol, vinyl ethers, vinyl esters, allyl alcohol, allyl ethers, allyl esters, vinyl imidazole, allyl imidazole, and any combination thereof.

5. The composition of claim 1, wherein the clay inhibiting agent is selected from the group consisting of:
acrylonitrile-derived inhibitors that are a mixture of polyacrylates and polyacrylamides, with a molecular weight ranging from 1 million g/mol to 15 million g/mol; and
quaternary amines derived from fatty acids, potassium chloride, or mixtures thereof.

6. The composition of claim 5, wherein the clay inhibiting agent is a mixture of polyacrylates and polyacry-lamides with an average molecular weight of $1\times10^6$ g/mol to $15\times10^6$ g/mol.

7. The composition of claim 1, wherein the alkalizing and acid gas sequestering agent is one of an alkanolamine and an alkylamine that comprises at least one member selected from the group consisting of mono-ethanolamine, diethanolamine, 1-amino-2-propanol, ethylenediamine 1,2-di-amino-propane, diethylenetriamine, triethylenetriamine, tetraethylenepentamine, and amines derived from mono-, di-, or tri-alcohols.

8. The composition of claim 1, wherein the alkalizing agent and acid gas sequestering agent is an amine derived from one of a mono-alcohol, a di-alcohol or a tri-alcohol.

9. A water-based foamed fluid for drilling depressed areas in oil and gas wells, the water-based foamed fluid comprising:
I) a composition comprising:
(ix) a base fluid;
(x) a stabilizing agent comprising treated montmorillonite;
(xi) a viscosifying agent comprising Xanthan gum with an average molecular weight of $2\times10^6$ g/mol;
(xii) a filtering reducing agent;
(xiii) a clay inhibiting agent;
(xiv) an alkalizing agent and acid gas sequestering agent;
(xv) a thermal stabilizing agent comprising a polymer derived from an alkali metal salt of 2-acrylamide-2-methyl-propane sulfonic acid; and
(xvi) a foaming agent comprising a mixture of saturated fatty acids of the alkyl group of 10 carbon atoms to 14 carbon atoms with a range of 2 to 8 moles of ethylene oxide, and
II) occluded gas bubbles,
wherein the water-based foamed fluid has a thermal stability higher than 180° C.

10. The water-based foamed fluid of claim 9, wherein the gas bubbles are selected from the group consisting of air, cryogenic nitrogen, membrane nitrogen, carbon dioxide, and another gas capable of generating foam in the water-based foam fluid.

11. The water-based foamed fluid of claim 9, wherein, for each $m^3$ of the composition, the composition includes:
(i) 900 to 1,000 L of the base fluid;
(ii) 15 to 40 kg of the stabilizing agent;
(iii) 2 to 10 kg of the viscosifying agent;
(iv) 6 to 15 kg of the filtering reducing agent;
(v) 4 to 15 kg of the clay inhibiting agent;
(vi) 2 to 10 L of the alkalizing agent and acid gas sequestering agent;
(vii) 15 to 20 kg of the thermal stabilizing agent; and
(viii) 10 to 25 L of the foaming agent.

12. The composition of claim 1, wherein, for each $m^3$ of the composition, the composition includes:
(i) 900 to 1,000 L of the base fluid;
(ii) 15 to 40 kg of the stabilizing agent;
(iii) 2 to 10 kg of the viscosifying agent;
(iv) 6 to 15 kg of the filtering reducing agent;
(v) 4 to 15 kg of the clay inhibiting agent;
(vi) 2 to 10 L of the alkalizing agent and acid gas sequestering agent;
(vii) 15 to 20 kg of the thermal stabilizing agent; and
(viii) 10 to 25 L of the foaming agent.

* * * * *